Patented Dec. 27, 1938

2,141,406

UNITED STATES PATENT OFFICE 2,141,406

PROCESS OF PRODUCTION OF SUCCINIC ACID

Ebenezer E. Reid, Baltimore, Md., assignor to Hercules Powder Company, Wilmington, Del., a corporation of Delaware No Drawing. Application March 15, 1938, Serial No. 195,957

7 Claims. (Cl. 260—537)

This invention relates to the improved method for the commercial production of succinic acid and more particularly to a method for the production of succinic acid from maleic acid.

Heretofore it has been proposed to produce succinic acid by the catalytic hydrogenation of maleic acid. In U. S. Patent 1,491,465, Craver discloses a method for the production of succinic acid by the hydrogenation of a metallic salt of maleic acid in the presence of supported nickel catalyst, and the treatment of the resulting metallic salt of succinic acid with hydrochloric acid to release succinic acid. This procedure is effective for the production of succinic acid, but has the disadvantage of the care and expense attached to the preparation of an active hydrogenation catalyst and removing it from the solution of the succinate.

It is the object of this invention to provide a simple, economical and efficient method for the conversion of maleic acid to succinic acid, which avoids the necessity for using a hydrogenation catalyst and the disadvantages connected therewith.

The method in accordance with this invention, by which I accomplish this objective, comprises reacting an aqueous solution of maleic acid with a metal which is more electro-positive than hydrogen and less electro-positive than the alkaline earth metals, removing any precipitate of the succinate which is formed by acidification of the solution, by the periodic addition of an acid which will dissolve the metal succinate and release succinic acid, and which is non-oxidizing under the conditions of reaction.

In carrying out the method in accordance with this invention, the metal more electro-positive than hydrogen which I use reacts with the maleic acid to form the corresponding metal salt of succinic acid. The acid stronger than succinic acid which is added to the reaction mixture frees the succinic acid from this metal salt, so that succinic acid may be separated directly from the solution at the end of the reaction. It is desirable to add the acid to the solution while the metal salt of succinic acid is still being formed, to prevent a large concentration of the metal succinate being built up with a resulting decrease in the hydrogen ion concentration of the solution to the point where the reaction between the metal and the maleic acid is slowed down and finally stopped, and to prevent the coating of the metal by the precipitated salt. However, it is not desirable to add an excessive amount of strong mineral acid to free the succinic acid, since any excess will react directly with the metal, resulting in a waste of both the metal and the added acid, and a lowered yield of succinic acid.

The temperature at which I carry out the reaction will depend upon the particular metal which I have chosen. The more strongly electropositive the chosen metal in the designated group, the lower may be the temperature of reaction which I use. However, in practice, I ordinarily prefer to use a sufficiently elevated temperature to keep in solution the succinic acid released by the reaction. By keeping the succinic acid in solution until the reaction has gone to completion, I avoid foaming, which otherwise proves somewhat troublesome.

If the reaction has been carried out at an elevated temperature, the succinic acid may be separated from the reaction mixture at the end of the reaction by cooling the mixture to room temperature or slightly below, and filtering or otherwise separating the crude succinic acid crystals from the solution. However, if the reaction has been carried out at room temperature, the succinic acid crystals will have separated from the reaction mixture during the course of the reaction and may be removed simply by filtering or otherwise separating them from the mixture.

The metallic element more electro-positive in nature than hydrogen which I may use may be, for example, tin, nickel, cobalt, iron, cadmium, chromium, zinc, manganese, aluminum, or magnesium. I have found that, in general, I prefer to use zinc for this purpose. With the metals less electro-positive than zinc such as, for example, iron, cobalt, nickel, and tin, it is necessary to heat the reaction mixture rather strongly, with the result that an increased quantity of fumaric acid is produced as an undesired by-product of the reaction.

The alkali metals and the alkaline earth metals cannot be satisfactorily used in the method in accordance with this invention because of their great reactivity with water, leading to decomposition, which may be sufficiently violent to cause explosions. In this connection, it will be appreciated that any reaction between the water in the aqueous maleic acid solution and the metal is an undesired side reaction which wastes both the metal and the acid added to release the succinic acid.

The acid which I utilize in my process may be any acid which is capable of freeing succinic acid from the metal succinate formed in the reaction, and which is non-oxidizing in its properties under the conditions of reaction, and hence, does not decompose the succinic acid or maleic acid. Thus, for example, I may use mineral acids, such as, hydrochloric acid, sulfuric acid, etc., or I may use organic acids such as formic acid, etc. It is desirable to utilize an acid which forms a freely water-soluble salt of the metal which I use in the process. By using such an acid, the metallic salt formed by the decomposition of the succinate remains in solution and does not contaminate the succinic acid separated from the solution at the end of the reaction.

The concentration of the aqueous solution of maleic acid which I treat in my process may vary over a wide range, up to complete saturation of the solution at the temperature of reaction. In general, I prefer to treat a solution of maleic acid containing an amount of maleic acid within the range of about 20% to about 40% by weight.

In carrying out my process, in its preferable form, I add to an aqueous solution of maleic acid the number of mols of metallic zinc equivalent to the maleic acid contained in the solution. The metallic zinc is preferably in a finely divided form. The charge is heated to aid solution of the zinc and as zinc succinate begins to cloud the solution by precipitation, I add sufficient concentrated hydrochloric acid from time to time to clarify the solution. I prefer to add only enough of the concentrated hydrochloric acid to effect clarification of the solution, since any excess of concentrated hydrochloric acid merely reacts with the zinc and results in a waste of both the zinc and the hydrochloric acid and in a lowered yield of succinic acid. The temperature of the solution will desirably be kept at its boiling point to prevent precipitation of the succinic acid formed. Substantially all the zinc goes into solution and, any small amount remaining at the end of the reaction is filtered off while the solution is hot. The succinic acid is obtained in crystal form from solution by cooling it and filtering out the crystallized succinic acid. No evaporation step is necessary and yields of 85% to 95% of crude product can readily be obtained.

The procedure in accordance with this invention is further illustrated by the following examples:

Example I

In this example, two duplicate runs were made. In one of these runs granulated zinc was used, and in the other mossy zinc was used. In each of these runs, 260 g. of zinc (4 mols) was added to 1318 cc. of 35% aqueous maleic acid solution (4 mols maleic acid). The charges were heated over a steam bath and later over an open flame. On heating, the solution became cloudy. An amount of 35% hydrochloric acid solution was then added to the reaction mixture which was just sufficient to dispel the cloudiness. As the solution again became clouded, an additional amount of hydrochloric acid just sufficient to dispel the cloudiness was added. This procedure was followed until the theoretical amount of hydrochloric acid was added. The solution was then filtered and the filtrate allowed to stand until crystallization was substantially complete. The crystals formed were filtered off and washed with a small amount of distilled water. After drying the crystals in an oven at 100° C. the following weights were obtained:

|  | Run using mossy zinc | Run using gran. zinc |
| --- | --- | --- |
| Weight of crude succinic acid | 378 gms. | 382 gms. |
| Theoretical yield | 472 gms. | 472 gms. |
| Yield | 80% by wt. | 80.8% by wt. |

The filtrates were then cooled to 8° C. and the second crop of crystals obtained:

|  | Run using mossy zinc | Run using gran. zinc |
| --- | --- | --- |
| Weight of first crop of crystals | 378 gms. | 382 gms. |
| Weight of second crop of crystals | 32.5 gms. | 33 gms. |
| Cumulative yield | 410 gms. | 415 gms. |
| Yield | 86.9% by wt. | 87.8% by wt. |

Distillation of the crude products gave the following results:

|  | Run using mossy zinc | Run using gran. zinc |
| --- | --- | --- |
| Yield of succinic acid distillate | 93.2% by wt. | 96.0% by wt. |
| Fumaric acid content | Nil | Nil |

Example II

To 671 cc. of an aqueous solution of maleic acid containing 346 g. of maleic acid per liter was slowly added 140 g. of powdered iron. As the solution clouded, 50 cc. portions of a 35% hydrochloric acid were added periodically. The solution of the iron was aided by heating the charge to boiling. The charge was cooled and filtered. The crude crystals were washed with a small amount of distilled water. After drying at 100° C. the following weights were obtained:

Weight of crude succinic acid_____ 167 grams
Theoretical weight _____ 236 grams
Per cent yield (crude)_____ 70.8% by wt.

The filtrate was then partially evaporated and the second crop of crystals obtained:

Weight of first crop of crystals_____ 167 gms.
Weight of second crop of crystals____ 17 gms.
Cumulative yield _____ 78% by wt.

The crude product so produced was then distilled with the following results:

Per cent by weight
Yield of distillate_____ 95.2
Fumaric acid content_____ 40

Example III

To 1318 cc. of an aqueous maleic acid solution containing 352 g. of maleic acid per liter was added 224 g. of powdered iron. When the initial reaction had subsided, concentrated sulfuric acid sufficient to dissolve the precipitated iron succinate was added to the solution. As the solution continued to cloud more sulfuric acid was added periodically. This was continued until a total of 223 cc. of the concentrated acid (95%) had been added. On cooling, the succinic acid and $FeSO_4$ crystallized out. The crude crystals were washed twice with two one liter portions of water. The washed product was dried at 100° C.:

| | |
|---|---|
| Weight of crude succinic acid | 200.5 gms. |
| Theoretical weight | 472 gms. |
| Per cent yield of crude succinic acid | 42.4% by wt. |

The crude washed product was then distilled with the following results:

| | Per cent by weight |
|---|---|
| Yield of distillate | 94.6 |
| Fumaric acid content | 25 |

*Example IV*

To a maleic acid solution consisting of 196 g. of maleic anhydride plus 700 cc. distilled water was added 35 g. of aluminum shavings. The charge was heated under a reflux on a steam bath. No apparent reaction occurred until 30 cc. of concentrated hydrochloric acid had been added, after which the aluminum rapidly dissolved and cooling of the reaction vessel was necessary to retard the reaction. Almost all the aluminum went into solution without further addition of hydrochloric acid. The theoretical amount of hydrochloric acid to decompose the aluminum succinate formed was added to the red-colored solution and the charge filtered and allowed to cool.

Almost immediately crystals began to form. The charge was cooled to room temperature and filtered.

| | |
|---|---|
| Weight of crude succinic acid | 129 gms. |
| Weight of theoretical amount | 236 gms. |
| Yield (crude) succinic acid | 54.6% by wt. |

No second crop of crystals could be obtained, even after 400 g. of calcium chloride was added to effect "salting out".

It will be understood that the details and examples given hereinbefore are by way of illustration and not by way of limitation upon the invention as broadly explained and claimed herein.

What I claim and desire to protect by Letters Patent is:

1. A process for the production of succinic acid which comprises reacting an aqueous solution of maleic acid with a metal more electro-positive than hydrogen and less electro-positive than the alkaline earth metals while preventing the precipitation of the metallic salt of succinic acid from the solution by the addition of an acid capable of freeing succinic acid from its salts which added acid is non-oxidizing under the conditions of reaction, and separating succinic acid from the solution.

2. A process for the production of succinic acid which comprises reacting an aqueous solution of maleic acid with a metal more electro-positive than hydrogen and less electro-positive than the alkaline earth metals while preventing the precipitation of the metallic salt of succinic acid from the solution by the addition of an acid capable of freeing succinic acid from its salts which added acid is non-oxidizing under the conditions of reaction and which forms a freely water-soluble salt with the said metallic element, and separating succinic acid from the solution.

3. A process for the production of succinic acid which comprises reacting an aqueous solution of maleic acid with a metal more electro-positive than hydrogen and less electro-positive than the alkaline earth metals, while preventing the precipitation of the metal salt of succinic acid from the solution by the addition of an acid capable of freeing succinic acid from its salts which added acid is non-oxidizing under the conditions of reaction, the said reaction being carried out at a temperature high enough to prevent precipitation of the succinic acid, crystallizing the succinic acid from the solution by cooling and separating the crystalline succinic acid so formed from the solution.

4. A process for the production of succinic acid which comprises reacting an aqueous solution of maleic acid with a metal more electro-positive than hydrogen and less electro-positive than the alkali metals, while preventing the precipitation of metallic salt of succinic acid from the solution by the addition of a mineral acid which is non-oxidizing under the conditions of reaction and separating succinic acid from the solution.

5. A process for the production of succinic acid which comprises reacting an aqueous solution of maleic acid with metallic zinc, while preventing the precipitation of zinc succinate from the solution by the addition of an acid capable of freeing succinic acid from its salts which is non-oxidizing under the conditions of reaction and separating succinic acid from the solution.

6. A process for the production of succinic acid which comprises reacting an aqueous solution of maleic acid with metallic zinc, while preventing the precipitation of zinc succinate from the solution by the addition of hydrochloric acid and separating succinic acid from the solution.

7. A process for the production of succinic acid which comprises reacting an aqueous solution of maleic acid with metallic zinc at a temperature sufficiently elevated to prevent precipitation of succinic acid, while preventing the precipitation of metallic salt of succinic acid from the solution by the addition of hydrochloric acid, cooling the solution to cause crystallization of the succinic acid therefrom and separating the succinic acid crystals from the solution.

EBENEZER E. REID.